United States Patent
Wada et al.

(10) Patent No.: US 12,239,175 B2
(45) Date of Patent: Mar. 4, 2025

(54) TACTILE DEVICE

(71) Applicant: Nippon Telegraph and Telephone Corporation, Tokyo (JP)

(72) Inventors: Toshiki Wada, Tokyo (JP); Takako Ishihara, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 50 days.

(21) Appl. No.: 18/246,793

(22) PCT Filed: Oct. 30, 2020

(86) PCT No.: PCT/JP2020/040794
§ 371 (c)(1),
(2) Date: Mar. 27, 2023

(87) PCT Pub. No.: WO2022/091336
PCT Pub. Date: May 5, 2022

(65) Prior Publication Data
US 2023/0354934 A1 Nov. 9, 2023

(51) Int. Cl.
*A41D 19/00* (2006.01)
*G08B 6/00* (2006.01)

(52) U.S. Cl.
CPC ........... *A41D 19/0024* (2013.01); *G08B 6/00* (2013.01)

(58) Field of Classification Search
None
See application file for complete search history.

(56) References Cited

U.S. PATENT DOCUMENTS

| | | |
|---|---|---|
| 2019/0384390 A1 | 12/2019 | Cruz Hernandez |
| 2020/0215325 A1* | 7/2020 | Jaasma .............. A61N 1/36028 |
| 2021/0252278 A1* | 8/2021 | Hamner ............... A61N 1/0456 |
| 2022/0184397 A1* | 6/2022 | Raghunathan ....... A61B 5/4082 |
| 2024/0066286 A1* | 2/2024 | Yin ...................... A61N 1/0456 |

FOREIGN PATENT DOCUMENTS

JP   2009070263 A   4/2009

OTHER PUBLICATIONS

Pezent et al. "Tasbi: Multisensory Squeeze and Vibrotactile Wrist Haptics for Augmented and Virtual Reality," IEEE World Haptics Conference, Jul. 9, 2019, 6 pages. As discussed in the specification.

* cited by examiner

*Primary Examiner* — Matthew Yeung
(74) *Attorney, Agent, or Firm* — SLATER MATSIL, LLP

(57) ABSTRACT

A tactile device includes a wearing portion to be worn on a subject, a tactile stimulus generation portion that provides a tactile stimulus to a body surface of the subject, and a positioning portion that makes a place where the wearing portion is worn constant. The tactile stimulus generation portion is fixed to the wearing portion. The wearing portion is worn on an arm of the subject. A tactile stimulus is provided to a body surface of the arm of the tactile stimulus generation portion. The positioning portion is, for example, a glove integrally formed with the wearing portion.

4 Claims, 6 Drawing Sheets

TACTILE DEVICE

CROSS-REFERENCE TO RELATED APPLICATIONS

This application is a national phase entry of PCT Application No. PCT/JP2020/040794, filed on Oct. 30, 2020, which application is hereby incorporated herein by reference.

TECHNICAL FIELD

Technical Field

The present invention relates to a tactile device that provides a tactile stimulus to a body surface of a subject.

Background

Many tactile devices give a person a tactile sense by giving an electrical signal, mechanical vibration, an air pressure, a temperature change, and the like, from a tactile device worn on the person. In order to wear such a device on a subject, for example, a wearing mechanism such as a bracelet type has been proposed (Non Patent Literature 1).

CITATION LIST

Non Patent Literature

Non Patent Literature 1: E. Pezent et al., "Tasbi: Multisensory Squeeze and Vibrotactile Wrist Haptics for Augmented and Virtual Reality", IEEE World Haptics Conference, INSPEC Accession Number: 18957929, 2019.

SUMMARY

Technical Problem

Meanwhile, tactile devices in related art have the following problems. For example, a bracelet type wearing mechanism can be worn on any position of the arm. Thus, a contact state between the tactile device and the skin varies depending on a wearing position, and distribution of receptors on the skin varies, so that experience (bodily sensation) varies even if the same stimulation is output.

In order not to cause the above-described problem, it is required to wear the tactile device at a correct position, but individual differences occur in how the tactile device is worn due to a shape of the wearing mechanism, which often inhibits provision of uniform experience. In particular, in a case where an electrical signal is used as a tactile sense output method, deviation in a wearing position causes a difference in nerve or muscle to be stimulated, which makes experience completely different. In addition, for example, a signal for giving a feeling such as vibration may produce a feeling of piercing with a needle or may not be able to be sensed in the first place if a wearing site is different. In addition, in order to wear the tactile device at a correct position, it is not desirable from a viewpoint of ease of use to utilize a person who assists wearing or to make the user refer to a detailed wearing method.

Embodiments of the present invention have been made to solve the above problems, and an object of embodiments of the present invention is to easily wear a tactile device at a correct position.

Solution to Problem

A tactile device according to embodiments of the present invention includes a wearing portion to be worn on a subject, a tactile stimulus generation portion that is fixed to the wearing portion and provides a tactile stimulus to a body surface of the subject, and a positioning portion that makes a place where the wearing portion is worn constant.

Advantageous Effects of Embodiments of Invention

As described above, according to embodiments of the present invention, the positioning portion that makes the place where the wearing portion to which the tactile stimulus generation portion is fixed is worn constant is provided, so that the tactile device can be easily worn at a correct position.

DETAILED DESCRIPTION OF ILLUSTRATIVE EMBODIMENTS

Figure 1:
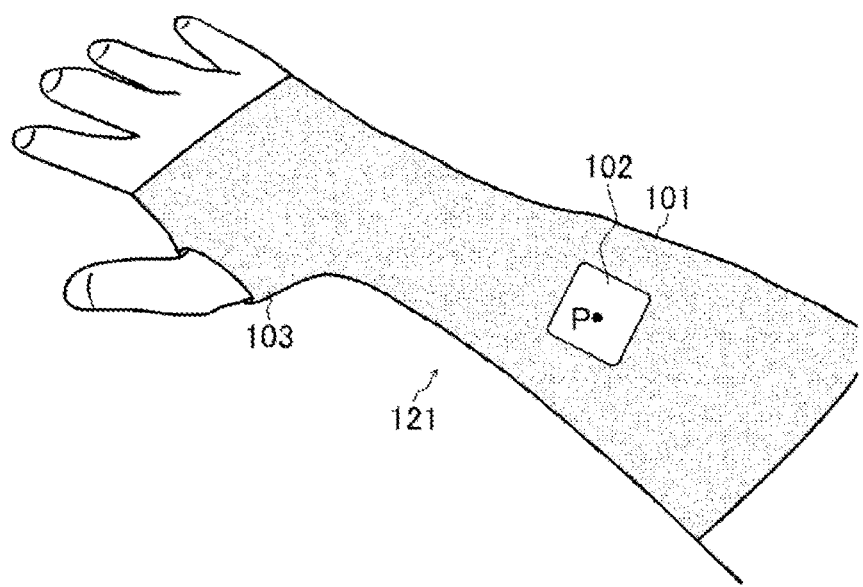
FIG. 1 is a configuration diagram illustrating a configuration of a tactile device according to an embodiment of the present invention.

Hereinafter, a tactile device according to an embodiment of the present invention will be described with reference to FIG. 1. The tactile device includes a wearing portion 101 to be worn on a subject, a tactile stimulus generation portion 102 that provides a tactile stimulus to a body surface of the subject, and a positioning portion 103 that makes a place where the wearing portion 101 is worn constant. The tactile stimulus generation portion 102 is fixed to the wearing portion 101. The wearing portion 101 is worn on the arm 121 of the subject. A tactile stimulus is provided to a body surface (skin) of the arm 121 of the tactile stimulus generation portion 102. The tactile stimulus generation portion 102 applies, for example, an electrical stimulus signal to the skin in contact with the tactile stimulus generation portion 102 to provide a tactile stimulus.

The positioning portion 103 is, for example, a glove integrally formed with the wearing portion 101. In this example, a glove shaped positioning portion 103 is integrally formed with the armband type wearing portion 101. In addition, the positioning portion 103 has a shape called a finger cutting glove in which a fingertip portion is exposed.

Figure 6:
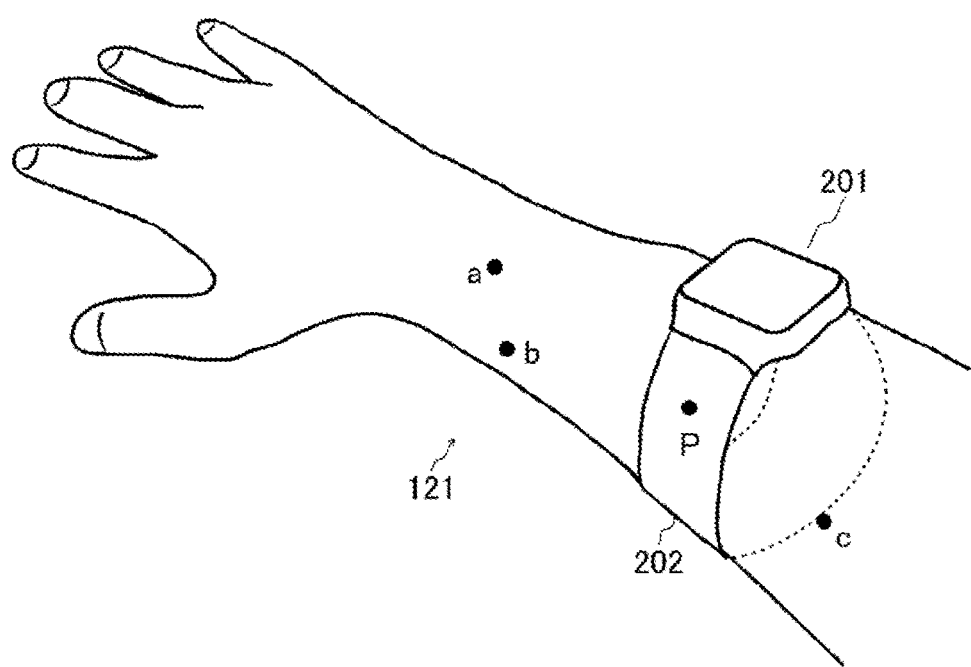
FIG. 6 is a configuration diagram illustrating a configuration of a tactile device in related art.

Here, a related art will be described with reference to FIG. 6. For example, a tactile device in which a tactile stimulus generation portion 201 is worn on the arm 121 by an armband type wearing portion 202 has already been proposed. A case will be considered where a designer of the tactile device has assumed and recommended to use the tactile stimulus generation portion 201 at a contact position at a point P of the arm 121. In the armband type wearing portion 202, depending on a wearing state of a user, the tactile stimulus generation portion 201 can be worn at a position other than the point P, such as a point a, a point b, or a point c, and is not unnatural in that state.

Tactile receptors are distributed throughout the entire body (the entire arm), and thus, no matter where the tactile stimulus generation portion 201 is worn, a provided tactile stimulus can be felt to some extent. However, a type and distribution of the receptors are different depending on a site, and thus, if the user wears the device to a more appropriate site, the user can experience intended experience as designed with a provided tactile stimulus. For this purpose, a structure of the wearing portion that reduces variation in the wearing position according to a wearing method of the user is important.

In order to solve the problem described above, according to the embodiment, the positioning portion 103 is provided in the wearing portion 101. As illustrated in FIG. 1, by using the glove shaped positioning portion 103, the wearing portion 101 is worn through the corresponding finger at the place where the finger of the glove is passed. It is difficult for the user to pass a finger other than the corresponding finger at the time of wearing, and thus, the position of the tactile stimulus generation portion 102 is uniquely limited. As a result, the tactile stimulus generation portion 102 is disposed not at an arbitrary location but near the point P as designed initially.

In this way, by using the positioning portion 103, it is possible to place the tactile stimulus generation portion 102 at an appropriate position without applying load to the user.

Figure 2:
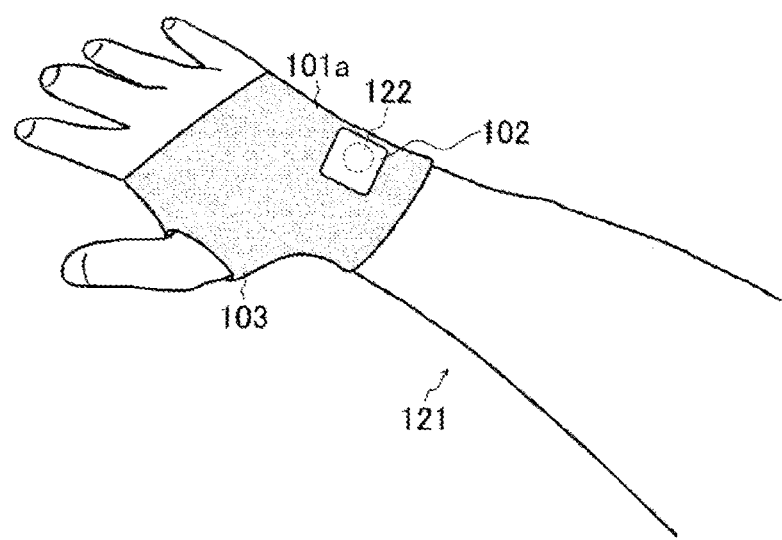
FIG. 2 is a configuration diagram illustrating another configuration of the tactile device according to the embodiment of the present invention.

In addition, as illustrated in FIG. 2, a glove having a length up to the vicinity of the wrist can be used as a wearing portion 101a. Also in this case, the glove serves as the positioning portion 103. In this configuration, the tactile stimulus generation portion 102 provides an electrical stimulus signal to the body surface (skin) in the vicinity of an ulnar styloid process 122 of the arm of the subject as a tactile stimulus.

Figure 3:
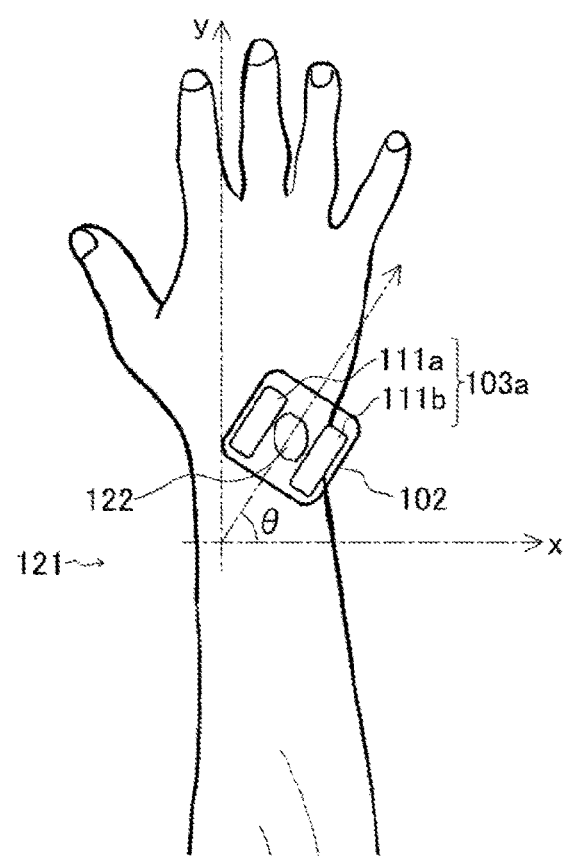
FIG. 3 is a configuration diagram illustrating a partial configuration of the tactile device according to the embodiment of the present invention.

Here, as illustrated in FIG. 3, two electrodes 111a and 111b that apply an electrical stimulus signal are provided at intervals at which the ulnar styloid process 122 can be sandwiched, and these electrodes can be used as a positioning portion 103a. In this configuration, an angle θ formed by a direction in which the two electrodes 111a and 111b extend and a direction (x-axis direction in FIG. 3) orthogonal to a direction (y-axis direction in FIG. 3) in which a tip (forearm) extends from the elbow of the arm 121 of the subject can be $15° \leq \theta \leq 90°$. Note that, here, while a case of the right arm has been exemplified, in a case of the left arm, it is desirable that wearing is performed in line-symmetric with respect to the y axis.

Figure 4:
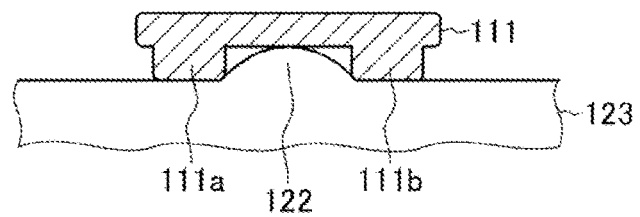
FIG. 4 is a cross-sectional view illustrating a configuration of the tactile device according to the embodiment of the present invention.

As described above, by disposing the tactile stimulus generation portion 102 so as to sandwich the ulnar styloid process 122 between the two electrodes 111a and 111b of an electrode module 111 for providing an electrical signal (see FIG. 4), the tactile stimulus generation portion 102 is also configured to include a positioning portion 103a in addition to the glove-like positioning portion 103.

Here, the electrode 111a and the electrode 111b are provided on a pedestal of the electrode module 111 at a predetermined interval. In addition, a thicknesses of the electrode 111a and the electrode 111b (a thickness of a portion protruding from the electrode module 111) are set to values at which the electrode 111a and the electrode 111b can come into contact with the surrounding skin 123 in a state where the ulnar styloid process 122 is sandwiched between the electrode 111a and the electrode 111b. In a case of electrical stimulation, if a contact state of the electrode 111a and the electrode 111b with respect to the skin 123 becomes a poor contact state or the electrode floats from the skin 123, no tactile stimulus can be provided. It is therefore important to stabilize a worn state. If the electrode 111a and the electrode 111b are too thin, an effect of applying a tactile stimulus is small. On the other hand, if the electrode is too thick, the thickness of the entire device increases, which leads to increase in a size of the device. Thus, the thicknesses of the electrode 111a and the electrode 111b are desirably within 5 mm to 15 mm.

As described above, by using the two electrodes 111a and 111b as the positioning portion 103a, it is possible to naturally arrange the tactile stimulus generation portion 102 at a more optimal location at the time of wearing as compared with only the positioning portion 103. In addition, by placing the two electrodes 111a and 111b on the ulnar styloid process 122, it is possible to stably present a vibration sense by electrical stimulation. As a result, it is possible to stably fix the tactile stimulus generation portion 102 to an initial position and present a vibration sense that is most used around the wrist.

Figure 5:
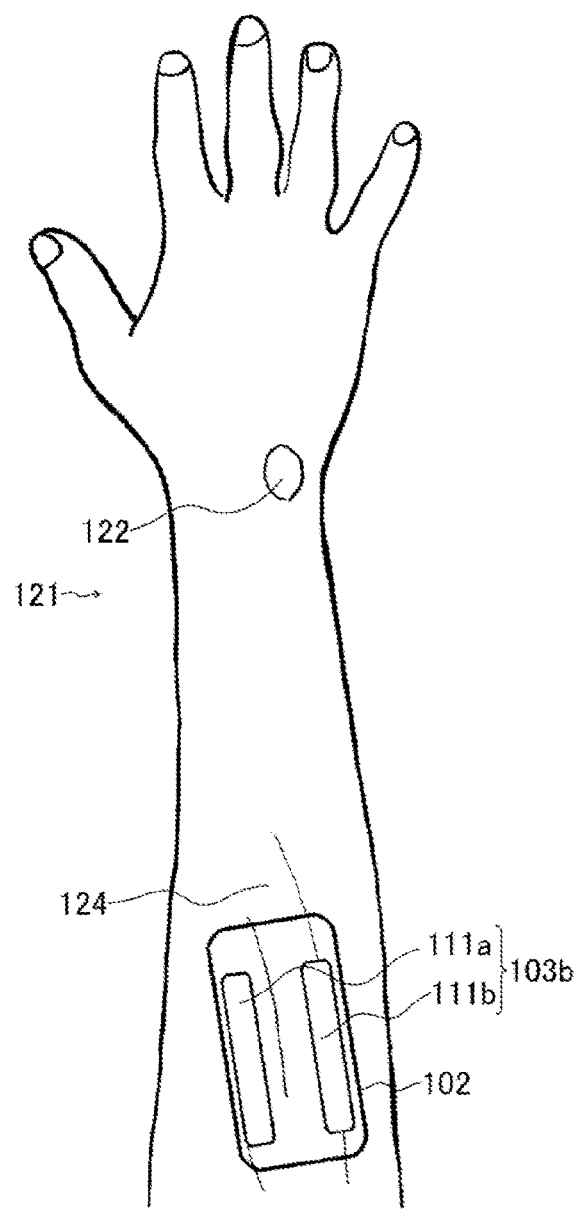
FIG. 5 is a configuration diagram illustrating a partial configuration of the tactile device according to the embodiment of the present invention.

In addition, as illustrated in FIG. 5, two electrodes 111a and 111b may be arranged at positions sandwiching an arm flexor muscle 124 of the arm 121 to form the positioning portion 103b. In this configuration, the tactile stimulus generation portion 102 gives an electrical stimulus signal to the body surface in the vicinity of the arm flexor muscle 124 of the arm 121 of the subject as a tactile stimulus. The arm flexor muscle 124 is one of the largest muscles in the forearm and is a site having a certain bulge, so that the device can be stably disposed by disposing the two electrodes 111a and 111b along the arm flexor muscle 124. By placing the two electrodes 111a and 111b on the arm flexor muscle 124, it is possible to stably give a vibration sense by electric stimulation.

In general, the arm flexor muscle 124 is a muscle extending in a direction (y-axis direction in FIG. 6) in which a tip (forearm) extends from the elbow of the arm 121. Thus, the two electrodes 111a and 111b are arranged such that the direction in which they extend is the y-axis direction. Furthermore, an angle θ formed by a direction in which the two electrodes 111a and 111b extend and a direction (x-axis direction) orthogonal to the direction (y-axis direction) in which the tip extends from the elbow of the arm 121 of the subject can be $60° \leq \theta \leq 120°$. By arranging the electrode 111a and the electrode 111b as an angle in this range, an electrical signal flowing between the electrode 111a and the electrode 111b flows in a form crossing the longitudinal direction (y-axis direction) of the muscle, which makes it easier to generate a vibration sense.

As described above, according to embodiments of the present invention, the positioning portion that makes the place where the wearing portion to which the tactile stimulus generation portion is fixed is worn constant is provided, so that the tactile device can be easily worn at a correct position.

Note that the present invention is not limited to the embodiment described above, and it is obvious that many modifications and combinations can be implemented by a person having ordinary knowledge in the art within the technical idea of the present invention. For example, in the above description, the arm has been described as an example, but the present invention is not limited to this, and the place at which the tactile device is worn can be another place of the human body such as an ankle.

REFERENCE SIGNS LIST

101 Wearing portion
102 Tactile stimulus generation portion
103 Positioning portion
121 Arm.

The invention claimed is:

1. A tactile device comprising:
a wearing portion configured to be worn on an arm of a subject;
a tactile stimulus generation portion fixed to the wearing portion and configured to provide a tactile stimulus to a body surface of the subject; and
a positioning portion configured to make a place where the wearing portion is worn constant,
wherein:
the positioning portion includes two electrodes configured to be disposed at positions sandwiching an ulnar styloid process of the subject and configured to apply an electrical stimulus signal as the tactile stimulus, and
an angle $\theta$ formed by a direction in which the two electrodes extend and a direction orthogonal to a direction in which the arm of the subject extends is $15° \leq \theta < 90°$.

2. The tactile device according to claim 1, wherein:
the positioning portion is a glove integrally formed with the wearing portion.

3. A tactile device comprising:
a wearing portion configured to be worn on a subject;
a tactile stimulus generation portion fixed to the wearing portion and configured to provide a tactile stimulus to a body surface of the subject; and
a glove integrally formed with the wearing portion, the glove configured to makes a worn position of the wearing portion constant,
wherein:
the glove includes two electrodes configured to be disposed at positions sandwiching an ulnar styloid process of the subject and configured to apply the tactile stimulus, and
an angle $\theta$ formed by a direction in which the two electrodes extend and a direction orthogonal to a direction in which an arm of the subject extends is $15° \leq \theta < 90°$.

4. The tactile device according to claim 3, wherein:
the tactile stimulus generation portion provides an electrical stimulus signal to the body surface of the subject as the tactile stimulus.

* * * * *